G. HEGER.
OSCILLATING MOTOR.
APPLICATION FILED DEC. 21, 1908.

949,372.

Patented Feb. 15, 1910.

2 SHEETS—SHEET 1.

WITNESSES.

INVENTOR.
George Heger.
By Benedict, Morsell & Caldwell
ATTORNEYS.

G. HEGER.
OSCILLATING MOTOR.
APPLICATION FILED DEC. 21, 1908.

949,372.

Patented Feb. 15, 1910.

2 SHEETS—SHEET 2.

WITNESSES.

INVENTOR.
George Heger
By Benedict, Morsell & Caldwell
ATTORNEYS.

UNITED STATES PATENT OFFICE.

GEORGE HEGER, OF MILWAUKEE, WISCONSIN, ASSIGNOR OF ONE-HALF TO WILLIAM F. BARENZ, OF MILWAUKEE, WISCONSIN.

OSCILLATING MOTOR.

949,372.  Specification of Letters Patent.  Patented Feb. 15, 1910.

Application filed December 21, 1908. Serial No. 468,475.

*To all whom it may concern:*

Be it known that I, GEORGE HEGER, residing in Milwaukee, in the county of Milwaukee and State of Wisconsin, have invented new and useful Improvements in Oscillating Motors, of which the following is a description, reference being had to the accompanying drawings, which are a part of this specification.

This invention relates to improvements in oscillating motors.

One of the objects of this invention is to form a simple and efficient motor in which all of the operating parts are positioned within the motor casing and a positive and rapid movement of the valve controlling the power medium is provided for.

A further object of the invention is to provide a motor in which the valve controlling the power medium is positively held and prevented from moving until the motor piston has moved to substantially the end of its oscillation.

A still further object of the invention is to provide an improved form of oscillating valve which is adapted to be held to its seat by the pressure of the power medium.

With the above and other objects, in view, the invention consists of the device and its parts, or their equivalents, as hereinafter set forth.

Figure 1:
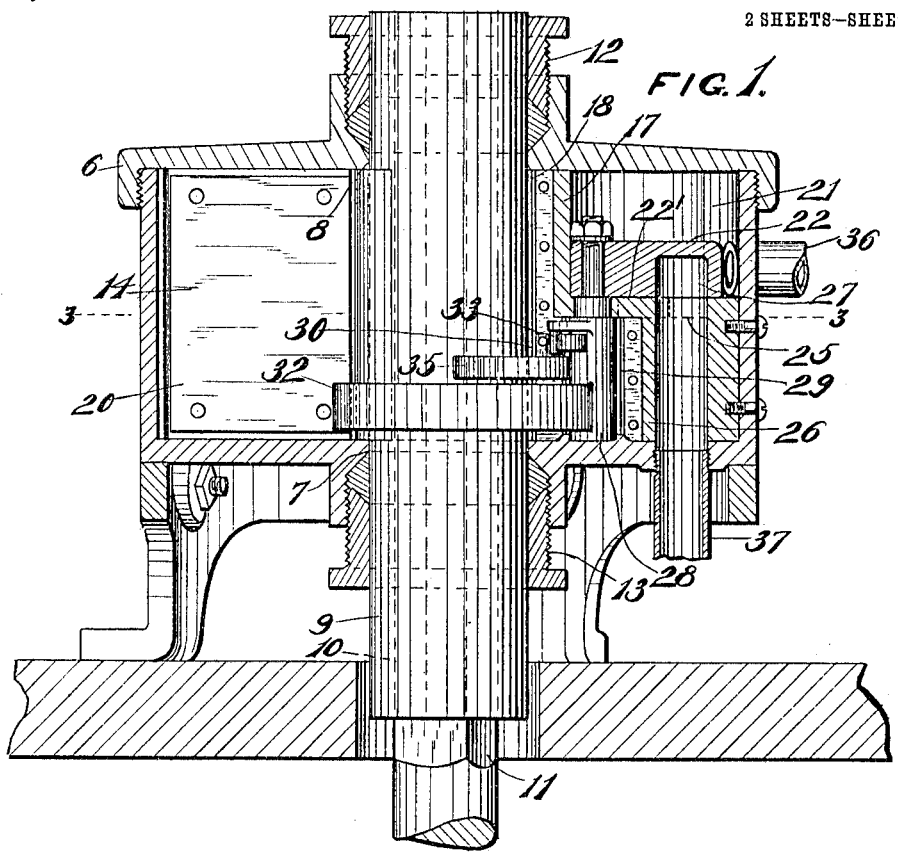
Figure 4:
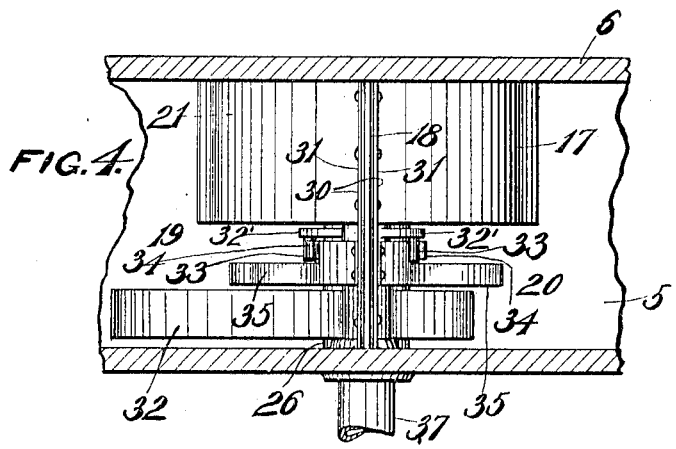
Figure 2:
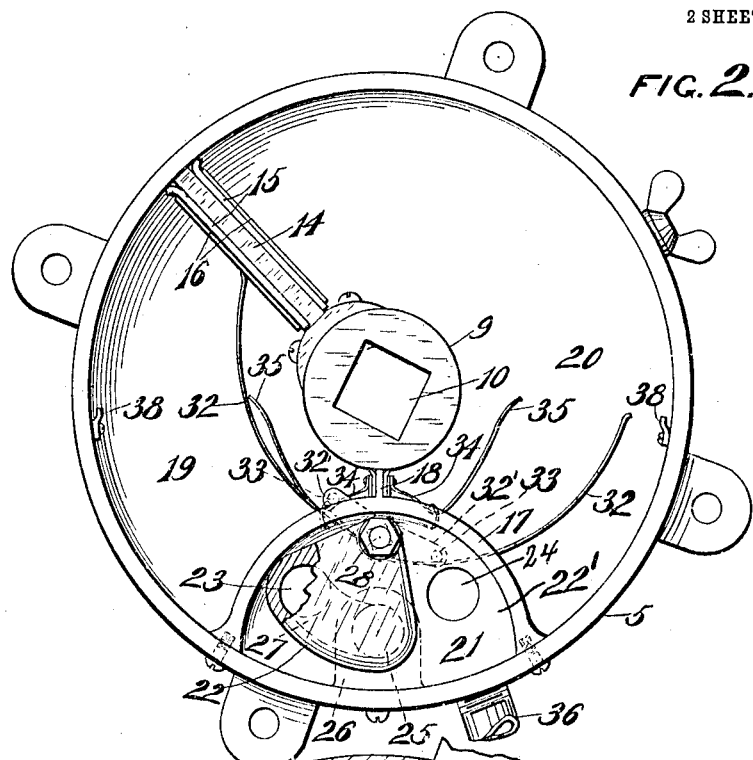
Figure 3:
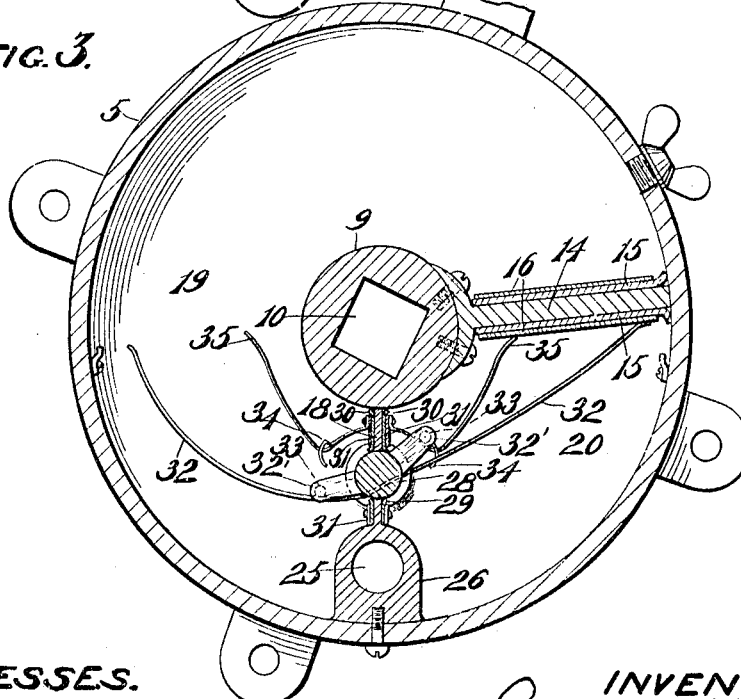

In the accompanying drawings in which the same reference characters indicate the same parts in the several views; Figure 1 is a central vertical sectional view of the complete motor shown in connection with a fragment of a washing machine; Fig. 2 is a plan view of the motor with the top or cover removed to show interior construction; Fig. 3 is a horizontal sectional view taken on line 3—3 of Fig. 1; and, Fig. 4 is a vertical detail view of the valve operating mechanism and a fragment of the casing.

Referring to the drawings, the numeral 5 indicates the motor casing which may be of any desired shape or size, but is preferably of cylindrical form as shown. For convenient accessibility to the interior of the casing the removable top or cover 6 is in the form of a screw cap and its threaded flange is adapted to engage the threaded open end of the cylindrical casing. The top and bottom portions of the casing are provided with openings 7 and 8 through which the tubular piston rock-shaft 9 slightly extends. The bore 10 of the piston rock-shaft is preferably square in cross section for convenience in connecting to the squared end of a washing machine shaft 11 or other device which it is desired to actuate. The top and bottom portions of the casing are provided with stuffing boxes 12 and 13 which surround the rock-shaft and prevent the leakage of the power medium.

A piston 14 located within the casing and connected rigidly to the rock-shaft 9 extends radially therefrom to the walls of the casing and is provided with packing plates 15 positioned on each side of the piston. The edges of these packing plates are adapted to rub against the top, bottom and cylindrical surfaces of the casing to form liquid tight joints between the piston and the casing. Guard plates 16 serve to hold the packing plates in position and also as contact plates for actuating the valve mechanism to be hereinafter described.

A chambered valve casing 17 is located within the motor casing and connected thereto and is provided with a flange portion 18 which serves as a vertical partition to divide the motor casing into two chambers 19 and 20, one being located on each side of the piston. The valve casing is semicircular in shape and in connection with the cover and a portion of the cylindrical wall of the motor casing forms a valve chamber 21 within which an oscillating valve 22 is adapted to control the admission of the power medium to the piston chambers. The horizontal partition 22' of the valve casing is provided with two inlet openings 23 and 24 which opens communication between the valve chamber and the piston chambers. An exhaust opening 25 is also provided in the horizontal wall and the tubular extension 26. This opening is located medially between the inlet openings and extends to the outside of the casing. The valve 22 is provided with a segmental recess 27 in its sliding face which is adapted to register with the exhaust opening and alternately with one or the other of the inlet openings so as to alternately admit the power medium to one of the piston chambers and simultaneously open communication from the other piston chamber to the exhaust opening. A valve rock-shaft 28 mounted in the valve casing and extending therefrom and having a bearing in the bottom of the motor casing, is rigidly connected to the oscillating valve and is adapted to oscillate the valve to register alternately with both inlet openings. The valve rock-shaft is of larger diameter than the thickness of the flange partition 18 between the horizontal wall of the valve casing and the bottom of the motor casing and consequently the flange is divided vertically by a slot of the width of the diameter of said shaft. The valve rock-shaft completely fills this slot but in order to form a liquid tight joint, packing plates 29 and 30 are positioned against each side of the vertical partition and the edges of these packing plates bear against the valve rock-shaft to form a liquid tight joint. The packing plates 30 also bear against the tubular rock-shaft 9 to form a liquid tight joint. Guard plates 31 are positioned against the outer sides of the packing to protect and hold the edges of the packing in proper position. A curved valve operating spring 32 connected to the valve shaft 28, preferably by being positioned in a slot in said shaft and brazed or soldered thereto, extends from both sides of the shaft in a curve, horizontally, into the path of movement of the oscillating piston.

Radial holding arms 32' rigidly connected to the sides of the valve shaft are provided with depending pins 33 which are adapted to engage spring latches 34 connected, one on each side of the vertical partition 18. These spring latches are provided with trip arms 35 forming part thereof and extending into the path of movement of the piston and are adapted to be alternately engaged by said piston to trip or release the latches from engagement with the holding arms and permit the spring, which has been placed under tension by the piston, to swing the valve around to the opposite position where it will be held by means of the engagement of the other radial arm with the opposite spring latch.

The valve spring and the radial arms extend from the portions of the valve shaft which register with the slot in the vertical partition thus providing space for the rocking of said shaft without the arms and spring interfering with the partition.

The power medium is admitted to the valve chamber through the inlet pipe 36 and the discharge from the valve chamber is taken care of by the discharge pipe 37.

Stops 38 are positioned within the piston chamber and in the path of movement of the piston to limit the movement of said piston.

The operation of the motor is as follows, assuming that the piston and valve are in the positions shown in Fig. 2 the power medium or fluid under pressure is admitted to the valve chamber through the inlet pipe and passes through the inlet opening 24, in the horizontal wall 22' of the valve chamber into the piston chamber and exerts pressure on the piston and will move said piston to the left. The power medium in the piston chamber on the opposite side of the piston will pass out of said chamber through the opening 23, in the horizontal wall of the valve chamber into the segmental recess of the valve and out through the exhaust opening and the discharge pipe. The continuing movement of the piston will put the valve spring, to the left, under increasing tension, until the valve is released by the piston engaging the trip arm and forcing the spring latch out of engagement with the radial arm pin. As soon as this radial arm is released the tension of the valve spring will force the valve around to its opposite position and the other radial arm into engagement with the other spring latch to be held thereby until the piston engages its trip arm. This movement of the valve will reverse the direction of flow of the power medium causing it to enter into the chamber opposite to the one into which it had previously been flowing and the medium which has imparted its energy to the piston is free to flow out through the inlet opening which has been covered by the valve and to the discharge pipe. The pressure of the power medium in the valve chamber tends to hold the valve tightly against the horizontal wall of the valve chamber and prevents leakage of the medium.

From the foregoing description it will be seen that the motor is simple and efficient and by the provision of the spring latches and the valve spring, the valve is prevented from moving until the piston has reached, substantially, the end of its oscillation and when the valve is moved, it is swung with a quick positive movement to its other position and locked by the latch until it is again released by the piston moving in the opposite direction.

While the motor is shown in connection with a fragment of a washing machine it is to be understood that it is not confined to this use alone as it is adapted to drive all kinds of devices in general.

What I claim as my invention is;

1. An oscillating motor comprising a casing, a valve chamber provided with inlet and outlet openings, a power medium inlet means in communication with said chamber, a valve controlling said openings, an operating means for said valve, a locking means for said valve, and an oscillating piston within the casing constructed and adapted to unlock said locking means and release said valve and cause the valve to move to its opposite position.

2. An oscillating motor comprising a cylindrical casing, a valve chamber provided with inlet and outlet openings, a power medium inlet means in communication with said chamber, an oscillating valve controlling said openings, an operating means for said valve, locking means for said valve, trip arms for said locking means, and an oscillating piston within the casing constructed and adapted to engage the trip arms to release said valve and cause said valve to move to its opposite position.

3. An oscillating motor comprising a cylindrical casing, a radial partition within the casing, a valve chamber forming part of said partition and provided with inlet and outlet openings, a power medium inlet means in communication with said chamber, an oscillating valve controlling said openings, an operating means for said valve, a valve-shaft connected to said valve, a radial arm connected to said valve-shaft, a latch for engaging said arm, and an oscillating piston within the casing constructed and adapted to move the latch and release the radial arm and cause the valve to move to its opposite position.

4. An oscillating motor comprising a cylindrical casing, a radial partition within the casing, a valve chamber forming part of said partition and provided with inlet and outlet openings, a power medium inlet means in communication with said chamber, an oscillating valve controlling said openings an operating means for said valve, a valve-shaft connected to said valve and mounted in the radial partition, radial arms connected to said valve shaft and extending, one arm on each side of the radial partition, latches connected to the radial partition for engaging the radial arms, trip arms forming part of the latches, and an oscillating piston within the casing constructed and adapted to move the trip arms and release the valve and cause the valve to move to its opposite position.

5. An oscillating motor comprising a cylindrical casing, a valve chamber provided with inlet and outlet openings, a power medium inlet means in communication with said chamber, a valve controlling said openings, a locking means for said valve, an oscillating piston within the casing constructed and adapted to unlock said locking means and release said valve, and a yielding means interposed between the piston and the valve which is adapted to be put under tension by the movement of the piston and to move said valve to its opposite position when unlocked by said piston.

6. An oscillating motor comprising a cylindrical casing, a valve chamber provided with inlet and outlet openings, a power medium inlet means in communication with the chamber, a valve controlling said openings, a valve shaft connected to said valve, locking means for said shaft, an oscillating piston within the casing constructed and adapted to release said locking means from said shaft, and a spring interposed between the piston and the valve adapted to be put under tension by the movement of the piston and to move said valve to its opposite position when unlocked by said piston.

7. An oscillating motor comprising a cylindrical casing, a valve chamber provided with inlet and outlet openings, a power medium inlet means in communication with the chamber, a valve controlling said openings, a valve shaft connected to said valve, locking means for said shaft, an oscillating piston within the casing constructed and adapted to release said locking means from said shaft, and a spring connected to the valve-shaft and positioned in the path of movement of the piston and adapted to be put under tension by the movement of the piston and to move the valve to its opposite position when the shaft is released from the locking means by said piston.

8. An oscillating motor comprising a cylindrical casing, a radial partition within the casing, a valve chamber forming part of said partition and provided with inlet and outlet openings, a power medium inlet means in communication with said chamber, an oscillating valve controlling said openings, a valve-shaft connected to said valve and mounted in the radial partition, radial arms connected to said valve shaft and extending, one arm on each side of the radial partition, spring latches connected to the radial partition for engaging the radial arms, trip arms connected to said latches, a rock-shaft mounted in the casing, an oscillating piston connected to the shaft, packing plates positioned against the moving parts, and a spring connected to the valve shaft and extending, one portion on each side of the radial partition and positioned in the path of movement of the piston and adapted to be put under tension by said movement of the piston and to move said valve to its opposite position when unlocked by said piston.

9. An oscillating motor comprising a cylindrical casing provided with a cap threaded thereto, a radial partition within the casing, a valve chamber forming part of said partition, and provided with inlet and outlet openings, a power medium inlet means in communication with said chamber, an oscillating valve controlling said openings, a valve-shaft connected to said valve and mounted in the radial partition, radial arms connected to said valve shaft and extending, one arm on each side of the radial partition, spring latches connected to the radial partition for engaging the radial arms, trip arms connected to said latches, a rock-shaft mounted in the casing, an oscillating piston connected to the shaft, stops for limiting the movement of the piston, packing plates positioned against the moving parts, and a spring connected to the valve shaft and extending, one portion on each side of the radial partition and positioned in the path of movement of the piston and adapted to be put under tension by said movement of the piston and to move said valve to its opposite position when unlocked by said piston.

In testimony whereof I affix my signature, in presence of two witnesses.

GEORGE HEGER.

Witnesses:
C. H. KEENEY,
ALMA A. KLUG.